Patented Sept. 19, 1944

2,358,768

UNITED STATES PATENT OFFICE 2,358,768

ALKYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application April 7, 1941,
Serial No. 387,264

8 Claims. (Cl. 260—464)

This invention relates to improved methods and processes for introducing alkyl, alkenyl and aralkyl groups into organic compounds.

This application is a continuation-in-part of our copending application, Serial Number 287,000, filed July 28, 1939.

Among the objects of this invention may be noted the provision of a general process for bringing about the alkylation, alkenylation and aralkylation of the type indicated, which is characterized by its high yields, its inexpensive and readily procurable reaction materials, and the facility with which it may be carried out. Other objects will be in part obvious and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processses hereinafter described, and the scope of the application of which will be indicated in the following claims.

In the conventional procedures compounds of the class typified by malonic esters, acetoacetic esters, other β-keto esters, and α-cyano esters are reacted in the form of their metallo derivatives, with an alkyl, alkenyl or aralkyl halide or sulfate.

The compound to be so alkylated, alkenylated or aralkylated is treated with a metal alcoholate in alcohol solution to form the metallo derivative. To this reaction mixture is then added the appropriate alkyl, alkenyl or aralkyl halide or sulfate and the reaction mixture is heated, usually at refluxing temperature until the mixture is no longer alkaline to phenolphthalein. In the case of malonic esters and alkyl, alkenyl or aralkyl halides the reaction may be shown as follows:

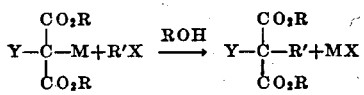

in which R is an organic group, Y is an organic radical, M is a metal, R' is the alkyl, alkenyl or aralkyl group of the halide or sulfate, and X is a halogen or sulfate group.

We have now found that if the alkylation, alkenylation or aralkylation with alkyl, alkenyl or aralkyl halides or di-sulfates be carried out in dialkyl carbonates as reaction media, improved yields of the alkylated or aralkylated products are obtained. In fact, in some instances, alkylations which have heretofore been considered impossible, can be easily carried out with high yield. The dialkyl carbonates are readily available, are excellent media for reactions of the types described, and contribute great manipulative convenience to the operation.

The process of the present invention may be represented by the following equation:

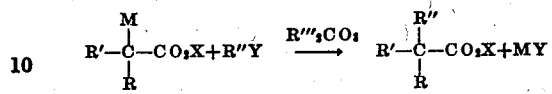

where R is hydrogen or an organic group, R' is an organic group, M is a metal, X is an organic esterifying group, R'' is an alkyl, alkenyl or aralkyl group, Y is a halogen or a sulfate group, and R''' is the alkyl of the dialkyl carbonate. The carbon atom to which the metallo group is attached, is attached to at least two carbon atoms which are multiply bonded to atoms other than carbon.

In carrying out the present invention, it is necessary only to heat together the metallo compound and the alkylating, alkenylating or aralkylating agent in the dialkyl carbonate.

Although it is preferred to use the dialkyl carbonate as the sole reaction medium, a portion of this may be replaced by inert solvents if desired.

The metallo group is usually the sodium compound. However, other metallo compounds such as those of the alkali metals and alkaline earth metals, may be substituted and alkylated, alkenylated or aralkylated in accordance with the present invention.

Although, as shown by the examples, it is immaterial how the metallo-derivative is prepared, carbonates as reaction media for alkylations, alkenylations or aralkylations are particularly advantageous when the metallo-derivative is prepared as described in our copending applications, Serial No. 287,000 filed July 28, 1939, and Serial No. 383,164, filed March 13, 1941.

The following examples illustrate the present invention. They are exemplary only:

Example No. 1

*Ethylation of diethyl sec.-butylmalonate*

The sodio derivative of the diethyl sec.-butylmalonate was prepared by treating the ester (54 g.) with one equivalent of alcohol-free sodium ethylate in diethyl carbonate (100 ml.), as described in our co-pending application, Serial No. 383,164.

To the resulting diethyl carbonate solution of the sodio derivative was then added ethyl bromide (31.5 g.) and the mixture was refluxed until it was no longer alkaline to phenolphthalein test paper. This required about fifty hours. The reaction mixture was then cooled and stirred into about an equal volume of cold water, and then made neutral or faintly acid to litmus with acetic acid. The organic layer was separated, the aqueous layer extracted with ether, and the combined extract and organic layer were dried with anhydrous sodium sulfate. The sodium sulfate was filtered off, and, after stripping off ether and diethyl carbonate, the residual ester was fractionated. A yield of 58 g. (95%) of diethyl sec.-butylethylmalonate was obtained. The product boiled at 69-74° C. at about 1-3.5 mm. Its refractive index was about $n$ 21/D 1.4331. Previously reported attempts by other methods to ethylate diethyl sec.-butylmalonate have given extremely small yields of the desired diethyl sec.-butylethylmalonate.

Example No. 2

*Allylation of diethyl sec.-butylmalonate*

The sodio derivative of diethyl sec.-butylmalonate was prepared by treating the ester (54 g.) with one equivalent of alcohol-free sodium ethylate in diethyl carbonate (100 ml.) as indicated in Example 1.

To the resulting diethyl carbonate solution of the sodio derivative was then added allyl bromide (35 g.) and the resulting mixture heated at 100-110° C. for six hours. The reaction mixture was worked up as in Example 1. A yield of 55 g. (86%) of diethyl allyl-sec.-butylmalonate was obtained. This ester boiled at 109-110.5° C. at about 5-6 mm., and its refractive index was about $n$ 21/D 1.4430.

The ester was identified by condensing it with urea using the well-known procedure for the preparation of barbituric acid derivatives. 5,5-allyl-sec.-butyl barbituric acid, melting at 108-109.5° C. (uncorrected), was obtained.

Example No. 3

*Isoamylation of diethyl ethylmalonate*

The sodio derivative of diethyl ethylmalonate was prepared by treating the ester (94 g.) with one equivalent of alcohol-free sodium ethylate and diethyl carbonate (300 ml.) as indicated in Example 1.

To the resulting diethyl carbonate solution of the sodio derivative was then added isoamyl bromide (92 g.) and the mixture was refluxed until no longer alkaline to phenolphthalein. This required about thirty hours. The reaction mixture was then worked up as described in Example 1. A yield of 98 g. (76%) of diethyl isoamylethylmalonate was obtained.

To compare the conventional alkylation procedure with our improved method, an isoamylation of diethyl ethylmalonate in alcoholic medium was carried out concurrently with the above experiment by the well-known methods. The isoamylation of diethyl ethylmalonate in this case resulted in a yield of only 78.4 g. (61%).

To indicate the independence of this alkylating procedure from the origin of the metallic derivative, the sodio derivative of diethyl ethylmalonate was prepared by the reaction of this ester with sodium metal in inert solvent, as follows:

Sodium (7.7 g.) was granulated under toluene (30 ml.) in one liter, three-necked flask, under nitrogen, by the well-known procedure. Then benzene (100 ml.) was added, and during one hour diethyl ethylmalonate (62.7 g.) was added with stirring. The reaction was rapid at first and the mixture heated up, but after about one-half of the sodium has been used up the reaction slowed down and it was necessary to warm the mixture with a bath at 60-70° C. for two hours before the sodium was practically all reacted. The flask was then attached to a column and arranged with an oil bath and a vacuum sealed stirrer. Diethyl carbonate (200 cc.) was added and the benzene was vacuum fractionated out at 130 mm. The mixture was cooled and isoamyl bromide (50.3 g.) was added. The mixture was then stirred intermittently for ten hours at a bath temperature of 110-115° C. The mixture was then worked up as described in Example 1. There was obtained a 75% (65 g.) yield of diethyl ethylisoamylmalonate, which boiled at 130-133° C. at 11 mm., and had an $n$ 20/D of 1.4300.

Example No. 4

*Isopropylation of diethyl malonate*

The sodio derivative of diethyl malonate was prepared by treating the ester (42 g.) with one equivalent of alcohol-free sodium ethylate in diethyl carbonate (150 ml.), as indicated in Example 1.

To the resulting diethyl carbonate solution of the sodio derivative was then added isopropyl bromide (38.3 g.) and the mixture refluxed intermittently for a period of 32 hours. The reaction mixture was then worked up as described in Example 1. A yield of 43 g. (80%) of diethyl isopropylmalonate was obtained. The product boiled at 126-129° C. at about 44 mm., and its refractive index was about $n$ 22.5/D 1.4181.

The isopropylation of diethyl malonate by the well-known Organic Syntheses procedure using alcohol as a medium for the reaction, is reported to give only 70-75% yield.

Example No. 5

*Ethylation of n-propyl α-cyano-iso-caproate*

The sodio derivative of n-propyl α-cyano-iso-caproate was prepared by treating the ester (39.5 g.) with one equivalent of alcohol-free sodium propylate in di-n-propyl carbonate (80 ml.), as indicated in Example 1.

To the resulting di-n-propyl carbonate solution of the sodio derivative was then added ethyl bromide (25.9 g.) and the mixture stirred and heated at 95-100° C. for about five hours. The reaction mixture was then worked up as described in Example 1. A yield of 35 g. (78%) of n-propyl α-cyano-α-ethyl-isocaproate, was obtained. The product boiled at 64.5-67.5° C. at about 0.4 to 0.9 mm. Its refractive index was about $n$ 26/D 1.4298.

Example No. 6

*Ethylation of n-butyl benzoylacetate*

The potassium derivative of n-butyl benzoylacetate was prepared by treating the ester (70 g.) with one equivalent of alcohol-free potassium n-butylate in di-n-butyl carbonate (160 ml.), as indicated in Example 1, for the preparation of sodio derivatives.

To the resulting di-n-butyl carbonate solution of the potassium derivative was then added ethyl bromide (40 g.) and the mixture heated at 100-105° C. for about 33 hours. Additional ethyl bromide (10 g.) was then added, and after 16 hours more heating, the mixture was no longer alkaline to phenolphthalein. The reaction mixture was then worked up as in Example 1. A yield of 63 g. (80%) of n-butyl ethyl-benzoylacetate was obtained. The product boiled at 116–117° C. at about 1 mm. Its refractive index was about $n$ 26.2/D 1.5003.

Example No. 7

Benzylation of n-butyl cetylmalonate

The potassium derivative of di-n-butyl cetylmalonate was prepared by treating the ester (75 g.) with one equivalent of potassium butylate in di-n-butyl carbonate (175 g.), as indicated in Example 1.

To the resulting di-n-butyl carbonate solution of the potassium derivative was added benzyl chloride (24 g.) and the mixture was heated at 100° C. for 4 hours, at which point it was no longer alkaline to phenolphthalein. The reaction mixture was then worked up as in Example 1. A yield of 60 g. (67%) of di-n-butyl benzylcetylmalonate, $n$ 27/D 1.4712, was obtained. It boiled at 238–240° C. at 1 mm.

The identity of the product was established by hydrolyzing it to the malonic acid, decarboxylating to cetylbenzylacetic acid and converting the latter to the 2,4,6-tribromoanilide which was analyzed for bromine.

A sample of the dibutyl cetylbenzyl malonate (20 g.) was hydrolyzed by refluxing for four hours with a solution of potassium hydroxide (10 g.) in 95% alcohol (100 ml.). Water was added and alcohol was distilled off until the odor of butyl alcohol disappeared. The solution was acidified, extracted with ether and the ether extract evaporated, leaving a residue of cetylbenzyl malonic acid (17 g.) which failed to crystallize. Heating the malonic acid at 140–180° caused carbon dioxide to be evolved and cetylbenzylacetic acid was formed; after recrystallization from petroleum ether it melted at 46–47° C. A sample of the cetylbenzylacetic acid (2 g.) was heated at 100–120° with thionyl chloride (1 ml.) to prepare the corresponding acid chloride which was mixed with 2,4,6-tribromoaniline (2 g.) and heated at 120–140° C. for one-half hour. After recrystallization from alcohol the 2,4,6-tribromoanilide of this acid melted at 85–87°. Analysis of the product gave 35.1% bromine compared to the theoretical calculated for $C_{31}H_{44}ONBr_3$ of 35.0%.

Example No. 8

Ethylation of diethyl phenylmalonate

The sodio derivative of diethyl phenylmalonate was prepared by treating the ester (118 g.) with one equivalent of alcohol-free sodium ethylate in diethyl carbonate (350 ml.), as indicated in Example 1.

To the resulting diethyl carbonate solution of the sodio derivative was then added ethyl bromide (65.4 g.) and the mixture heated at 95–100° C. for about five hours. The reaction mixture was worked up as in Example 1. A yield of 104 g. (79%) of diethyl ethyl phenylmalonate was obtained. The product boiled at 135–146° C. under 4.5–6.0 mm. pressure. This grade of ester is comparable to that obtained by the conventional ethylation procedures, while the yield is substantially greater.

The above experiment was repeated, substituting diethyl sulfate (84.7 g.) for ethyl bromide and heating the reaction mixture at 105–110° C. for about five hours. It was then worked up as in Example 1. A yield of 110 g. (84%) of diethyl ethylphenylmalonate, boiling at 146–150° C. at about 5–6 mm. pressure, was obtained in a state of purity superior to that usually obtained from the conventional ethylation procedure.

The ethylation of diethyl phenylmalonate with ethyl chloride can also be carried out advantageously by our procedure, as shown by the following experiment:

Ethyl chloride (52 g.) was dissolved in a diethyl carbonate (255 g. solution of the sodio-derivative of diethyl phenylmalonate (140 g.). The resulting mixture was placed in a steel bomb and immersed in an oil bath maintained at 150° C. The pressure in the bomb rose rapidly to 53 pounds per square inch and then diminished slowly as the reaction proceeded. After nine hours the pressure was 37 lbs. and remained constant during a further heating period of eight hours. After cooling, the contents were transferred to a separator containing water (100 g.) to bring into solution the sodium chloride formed in the reaction. The slightly alkaline mixture was neutralized with a small quantity of dilute sulfuric acid and the layers separated. After drying the oily layer it was carefully fractionated under reduced pressure. An 81% yield of diethyl ethylphenylmalonate (128 g.) was obtained.

To indicate the independence of this alkylating procedure from the origin of the metallo derivative, the magnesio derivative of diethyl phenylmalonate was prepared and ethylated.

Magnesium turnings (6.08 g.), anhydrous ethyl alcohol (250 ml.), carbon tetrachloride (5 ml.) and diethyl phenylmalonate (59 g.) were placed in a flask fitted with reflux condenser and stirrer. The mixture was stirred, and after its initial spontaneous reaction it was heated until all of the magnesium had dissolved. On cooling, a white crystalline compound crystallized. After filtering off, the crystals were partially dried in a vacuum desiccator over calcium chloride.

About 65 g. of the solid material, still containing an appreciable amount of ethyl alcohol, was then placed in a flask containing diethyl carbonate (250 ml.). The flask was connected to a fractionating column and all residual alcohol was removed at about 150 mm. pressure. The cooled reaction mixture was then treated with ethyl iodide (43 g.), and after 48 hours heating at 95–105° C., the reaction mixture was cooled and worked up as in Example 1. On distillation of the product a 90% yield of diethyl ethylphenylmalonate was obtained.

Example No. 9

Ethylation of diethyl ethylmalonate

The metallo derivative of diethyl ethylmalonate was prepared as described in our co-pending application, Serial No. 383,164 of March 13, 1941, from magnesium turnings (6.0 g.), anhydrous ethyl alcohol (200 ml.) and diethyl ethylmalonate (47 g.) in diethyl carbonate (300 ml.). All ethyl alcohol present was fractionated out after the magnesium turnings had completely dissolved.

To one-half of the resulting diethyl carbonate solution of the magnesium derivative of diethyl ethylmalonate was then added ethyl iodide (25 g.), and the mixture refluxed for 24 hours. The reaction mixture was then worked up as described in Example 1. A yield of 22 g. (83%) of diethyl diethylmalonate, was obtained. The ester boiled at 113–114° C. at about 18 mm., and its refractive index was about $n$ 19.5/D 1.4240.

Example No. 10

Allylation of diethyl malonate

The sodio derivative of diethyl malonate was prepared from sodium ethylate (equivalent to 18 g. of sodium) and diethyl malonate (120 g.) in diethyl carbonate (450 ml.) as in Example 1.

The alcohol-free reaction mixture was stirred at about 50° C. and allyl bromide (95 g.) diluted with diethyl carbonate (100 ml.) was added slowly from a dropping funnel. A solid, sodium bromide, separated as the allyl bromide reacted with the sodio derivative of diethyl malonate. On the following day the reaction mixture was heated to boiling to complete the reaction. The reaction mixture was worked up as in Example 1. A yield of 74 g. (50%) of diethyl allylmalonate, boiling at 100° C. at 9 mm., to 108° C. at 11 mm., $n$ 20/D 1.4300, was obtained.

Example No. 11

Butylation of diethyl allylmalonate

The sodio derivative of diethyl allylmalonate was prepared from sodium ethylate (equivalent to 8.6 g. of sodium) and diethyl allylmalonate (73.7 g.) in diethyl carbonate (250 ml.) as in Example 1.

The alcohol-free reaction mixture was stirred at about 60° C. and n-butyl bromide (60 g.) was added slowly from a dropping funnel. A solid, sodium bromide, separated as the butyl bromide reacted with the sodio derivative of the diethyl allylmalonate. On the following day the reaction mixture was heated to boiling to complete the reaction. The reaction mixture was worked up as in Example 1. A yield of 82 g. (87%) of diethyl butylallylmalonate, boiling at 129–134° C. at 11 mm., $n$ 20/D 1.4378, was obtained.

Example No. 12

Sec.-butylation of di-sec.-butyl malonate

The potassium derivative of di-sec.-butyl malonate was prepared by treating the ester (72 g.) with one equivalent of potassium sec.-butylate in di-sec.-butyl carbonate (200 ml.), as indicated in Example 1 for preparation of sodio derivatives.

To the resulting di-sec.-butyl carbonate solution of the potassium derivative was then added sec.-butyl bromide (50 g.) and the mixture heated at 95–105° C. for about 70 hours. The reaction mixture was then poured into ice water and worked up as in Example 1. A yield of 71 g. (78%) of di-sec.-butyl sec.-butyl-malonate, was obtained. The ester boiled at 92–96° C. at about 1–2 mm. Its refractive index was about $n$ 20.2/D=1.4282.

Example No. 13 n-Hexylation of ethyl acetoacetate

The sodio derivative of ethyl acetoacetate was prepared by treating the ester (65 g.) with one equivalent of sodium ethylate in diethyl carbonate (250 ml.), as indicated in Example 1.

To the resulting diethyl carbonate solution of the sodio derivative was then added n-hexyl bromide (90 g.), and the resulting mixture heated at 95–105° for about 50 hours. The reaction mixture was then worked up as in Example 1. A yield of 69 g. (65%) of ethyl α-n-hexylacetoacetate was obtained. The ester boiled at 148–149° C. at about 25 mm., and its refractive index was about $n$ 26.5/D 1.4316. It was further identified by its hydrolysis to methyl-n-heptyl ketone.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

What is claimed is:

1. The method which comprises reacting the diethyl ester of metallo sec.-butylmalonic acid, wherein the metal is selected from the group consisting of alkali metals and alkaline earth metals, with a substance selected from the alkyl, alkenyl and aralkyl halides and di-sulfates in a reaction medium consisting essentially of a dialkyl carbonate.

2. The method which comprises reacting the n-propyl ester of metallo α-cyano-iso-caproic acid, wherein the metal is selected from the group consisting of alkali metals and alkaline earth metals, with a substance selected from the alkyl, alkenyl and aralkyl halides and di-sulfates in a reaction medium consisting essentially of a dialkyl carbonate.

3. The method which comprises reacting the ethyl ester of metallo acetoacetic acid, wherein the metal is selected from the group consisting of alkali metals and alkaline earth metals, with a substance selected from the alkyl, alkenyl and aralkyl halides and di-sulfates in a reaction medium consisting essentially of a dialkyl carbonate.

4. The method which comprises reacting the sodio derivative of the diethyl ester of sec.-butylmalonic acid with allyl bromide in a reaction medium consisting essentially of diethyl carbonate.

5. The method which comprises reacting a compound selected from the group consisting of metallo malonic esters, metallo β keto esters, and metallo α cyano esters, wherein the metal is selected from the group consisting of alkali metals and alkaline earth metals, in a vehicle consisting essentially of a dialkyl carbonate with a substance selected from the group consisting of alkyl, alkenyl and aralkyl halides and di-sulfates.

6. The method which comprises reacting a metallo malonic ester, wherein the metal is selected from the group consisting of alkali metals and alkaline earth metals, in a vehicle consisting essentially of a dialkyl carbonate with a substance selected from the group consisting of alkyl, alkenyl and aralkyl halides and di-sulfates.

7. The method which comprises reacting a metallo β keto ester, wherein the metal is selected from the group consisting of alkali metals and alkaline earth metals, in a vehicle consisting essentially of a dialkyl carbonate with a substance selected from the group consisting of alkyl, alkenyl and aralkyl halides and di-sulfates.

8. The method which comprises reacting a metallo α cyano ester, wherein the metal is selected from the group consisting of alkali metals and alkaline earth metals, in a vehicle consisting essentially of a dialkyl carbonate with a substance selected from the group consisting of alkyl, alkenyl and aralkyl halides and di-sulfates.

VERNON H. WALLINGFORD.
AUGUST H. HOMEYER.